(12) United States Patent
Lamb et al.

(10) Patent No.: US 8,915,407 B2
(45) Date of Patent: *Dec. 23, 2014

(54) MOBILE CONFECTIONARY APPARATUS WITH PROTECTIBLE DISPENSING SYSTEM

(75) Inventors: Tony Lamb, Union, KY (US); Tony M. Guard, Union, KY (US)

(73) Assignee: Kona Ice, Inc., Florence, KY (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/439,923

(22) Filed: Apr. 5, 2012

(65) Prior Publication Data

US 2012/0199616 A1    Aug. 9, 2012

Related U.S. Application Data

(62) Division of application No. 12/171,930, filed on Jul. 11, 2008, now Pat. No. 8,157,136.

(60) Provisional application No. 60/959,588, filed on Jul. 16, 2007.

(51) Int. Cl.
*B60P 3/22* (2006.01)
*B60P 3/025* (2006.01)

(52) U.S. Cl.
CPC .................................. *B60P 3/0257* (2013.01)
USPC ............. 222/610; 222/608; 296/22; 141/231; 312/249.8; 312/249.13

(58) Field of Classification Search
CPC ....... B60P 3/025; B60P 3/0257; F25D 11/003
USPC .......... 222/108, 74, 75, 529, 144.5, 608–610; 296/22, 24.35, 24.36; 312/249.8, 312/249.13; 141/231
See application file for complete search history.

(56) References Cited

U.S. PATENT DOCUMENTS

| | | | |
|---|---|---|---|
| 2,733,094 A | | 1/1956 | Carlton |
| 2,784,999 A | * | 3/1957 | Hunt ................................ 296/22 |
| 2,982,578 A | | 5/1961 | Lowe |
| 3,180,529 A | * | 4/1965 | Buffington .................... 222/131 |
| 3,191,400 A | | 6/1965 | Swenson |
| 3,476,295 A | | 11/1969 | Telfer |
| 4,076,349 A | | 2/1978 | Gettleman et al. |
| 4,225,059 A | | 9/1980 | Kappos |
| 4,270,319 A | * | 6/1981 | Spasojevic .................... 52/36.2 |
| 4,359,073 A | | 11/1982 | de Stoutz |
| 4,456,149 A | | 6/1984 | Sciortino |
| 5,154,317 A | | 10/1992 | Roppolo, III |

(Continued)

*Primary Examiner* — J. Casimer Jacyna
(74) *Attorney, Agent, or Firm* — Wood, Herron & Evans, LLP (57) ABSTRACT

A mobile confectionary apparatus for dispensing beverages and/or frozen confections includes a vehicle configured for travel over public roads to a location such as a parking lot, street, festival or fair grounds, or the like. The vehicle includes an enclosure having an interior space in which one or more persons can prepare and dispense confections, or containers for confections or beverages. The enclosure includes one or more service windows or openings for dispensing the prepared confections or containers; and a self-serve liquid dispensing system on or in an outer surface of the enclosure, usable by recipients of the dispensed confections or containers, for selectably dispensing toppings on the confections, or liquids into the containers, separately from the dispensing and selling thereof. The dispensing system is closable or coverable by a person from within the interior space, to prevent access from the outside, and for cleaning, service and travel.

2 Claims, 9 Drawing Sheets

(56) References Cited

U.S. PATENT DOCUMENTS

| | | |
|---|---|---|
| 5,307,957 A | 5/1994 | Carlsson et al. |
| 5,564,597 A | 10/1996 | Koorse et al. |
| 5,704,676 A * | 1/1998 | Hill .......................... 296/24.35 |
| 6,189,944 B1 | 2/2001 | Piche |
| 6,640,569 B2 * | 11/2003 | Goosman ........................ 62/239 |
| 6,814,383 B2 * | 11/2004 | Reed et al. .................... 296/24.3 |
| 7,044,335 B2 * | 5/2006 | Aguirre et al. ............. 222/129.1 |

\* cited by examiner

Fig. 11

MOBILE CONFECTIONARY APPARATUS WITH PROTECTIBLE DISPENSING SYSTEM

This application is a divisional of co-pending U.S. patent application Ser. No. 12/171,930, filed Jul. 11, 2008 which claims the filing benefit of U.S. Provisional Application Ser. No. 60/959,588, filed Jul. 16, 2007, the disclosures of which are hereby incorporated herein by reference in the entireties.

TECHNICAL FIELD

This invention relates generally to a mobile confectionary apparatus for dispensing drinks and/or food items such as frozen confections and the like, and more particularly, to a vehicle including a side having a window through which confections, or confection containers are sold or distributed, and a protectible, self-service liquid dispensing system usable for adding a topping or dispensing liquid into the container, which dispensing system has an open, operational mode, and a closed, protected mode so as to be inaccessible by customers, and also for cleaning, service and preparation for travel.

BACKGROUND OF THE INVENTION

Mobile confectionaries for selling a variety of confections, e.g., snow cones, shaved ice, ice creams, beverages, have been around for years. The mobility is typically provided by incorporation into or onto a truck, trailer, kiosk, etc., and allows customers to purchase a beverage or the like in places they do not typically have an option to, e.g., festivals, parks, and on streets outside of customer's homes, etc. The dispensing of liquids, e.g., drinks, flavorings, etc, has typically been done by a person within the truck/trailer, or by the customer at a kiosk. The known kiosks used are generally inside a larger structure or temporarily at an event and left unprotected by the elements and need to be placed in a location by a secondary means of transportation. This is disadvantageous, as it either does not allow the units to be placed in locations where they are exposed to the elements, or it prevents easy portability.

Structurally, a mobile confectionery will typically include an enclosure, e.g. a box, having an interior work space outfitted for the preparation and sale of the confections, and at least one service window through which the confections are dispensed and the transaction is conducted. The work space will be large enough for at least one person to work, and will contain apparatus for preparing the confections, e.g., ice shaving or crushing apparatus, slush making apparatus, ice cream/custard dispensing apparatus, or the like.

It has been found that in the mobile confectionery field, profitability and customer satisfaction are largely dependent on consumer appeal and productivity, which are mainly the result of providing quality products and fast service. The sales opportunity may also be time sensitive, such as when crowds are present before or after a show or concert, or during an intermission, and can quickly dissipate. For instance, if the line of customers at one confectionary is longer than at others, a consumer may make a choice of another confectionery. Another important measure of product quality and customer satisfaction, particularly for frozen confections, such as shaved ice, snow cones, and the like, is the quantity of topping or flavoring applied to the confection. Still further from the productivity standpoint, particularly for sales to children, it has been observed that valuable time can be lost waiting for customers to select their topping or flavor.

Thus, what is sought is a mobile confectionary apparatus, which increases customer satisfaction, productivity and sales, particularly for frozen confections, and which overcomes one or more of the shortcomings and problems set forth above.

SUMMARY OF THE INVENTION

What is disclosed is mobile confectionary apparatus, which increases customer satisfaction, productivity and sales, and which overcomes one or more of the shortcomings and problems set forth above.

According to a preferred aspect of the invention, the mobile confectionary apparatus includes a mobile vehicle, such as a truck or trailer, including at least one upstanding side wall having an interior surface bounding an interior space on the vehicle adapted for receiving at least one person. The confectionery apparatus includes apparatus disposed in the interior space, configured to be usable or operable by a person for preparing a confection, or the space can be used for dispensing containers, such as, but not limited to, cups, for holding confections, such as beverages. For instance, such confection preparing apparatus can comprise, but is not limited to, apparatus for flaking, crushing and/or shaving ice, or for turning liquid into a frozen slush, and depositing the prepared confection in a cup or other container. Such apparatus can also include an insulated container, freezer or refrigerator. The side wall includes at least one opening or window through which the prepared confections, or confection containers, can be dispensed, and a monetary transaction for the confections conducted.

The side wall additionally includes a liquid dispensing system at a location so as to be accessible by a person located outside of the vehicle, the dispensing system being alternatively configurable in a dispensing or open mode or configuration, and a closed or protected mode or configuration. In the dispensing mode, the dispensing system has at least one liquid dispenser positioned and manually operable by a person located outside of the vehicle for dispensing a liquid into a purchased container, or onto a confection, disposed generally beneath the dispenser. Thus, using the system, the recipient of a container can select a liquid to be dispensed, and fill the container to a desired extent with the selected liquid. Similarly, a recipient of a confection can select and apply one or more toppings to the confection, in a desired amount. Additionally, in either instance, if allowed, the recipient can even leave and return later to refill the container or add toppings, which can be advantageous from a customer satisfaction standpoint. If the confection is for a child, the external dispensary gives an attending adult the ability to limit the amount of the beverage received or topping applied, and it allows the child to take a longer time if desired or necessary to select a flavor or flavors, which can also increase customer satisfaction. This is also desirable from an operations standpoint as reduces transaction time and personnel requirements, and increases the speed at which the confections are served, thereby improving productivity compared to if the containers are filled, or the toppings were applied by a worker.

As practical examples, a coach or parent purchasing confections for a team or several recipients can merely purchase a required number of confections, and the containers filled or toppings applied after the transaction, by the recipients. Since less worker time is required, fewer persons are required for serving.

The dispensing system is preferably quickly and easily movable or convertible to the closed or protected mode or configuration, from within the interior space of the vehicle. This is advantageous, as in the closed mode, access to the liquid beverage or toppings by persons outside of the vehicle is prevented, and it configures the system for travel and protects it from environmental elements, such as dirt, rain, and road spray during travel, and, in at least some embodiments, also allows cleaning the dispensing apparatus of the system from inside the vehicle.

According to another preferred aspect of the invention, each of the dispensers is connected by a liquid line to a reservoir carried on the mobile structure and containing a quantity of the beverage or topping for that dispenser. The system, in the dispensing configuration, additionally preferably includes a tray spaced at least generally below the dispenser or dispensers and configured for catching spilled or dropped liquid beverages or toppings and directing them to a waste container carried on the vehicle.

As a preferred configuration of the invention, the dispenser and tray of the system are integrated so as to be positioned at an angular relationship one to the other, so as to be jointly configurable in the dispensing and closed positions, for instance, but not limited to, by a simple pivoting or rotating action or movement, or by a sliding movement. Also preferably, when closed, the bottom or non-serving side of the tray can serve as the cover member.

According to various other preferred aspects of the invention, the system can include multiple dispensers for dispensing a variety of flavors of liquids can be provided, in connection respectively with reservoirs containing the liquids located within the vehicle, which liquids can be, for instance, flavored beverages such as soft drinks or juices, or toppings such as syrups. Gravity feed can be used for dispensing the liquids, or a pressurized system used.

As examples of alternative constructions for the dispensing system, the cover member can be a hinged member preferably automatically movable between an open or dispensing position, and a closed or covering position. As another alternative, the cover member can be configured as a sliding member disposed within the wall and manually or automatically slidable between open and closed positions. And, as an alternative integrated construction, the cover member and dispenser or dispensers can be incorporated into a drawer slidable into and out of the side wall.

As still another alternative configuration, the apparatus of the dispensing system can be recessed in an opening in the side wall, and the tray pivotally mounted to the side wall so as to be pivotable between a generally horizontal open or deployed position spaced at least generally below the dispenser, and an upstanding closed position covering and protecting the opening. In the open position, the tray is configured for catching overflowed or spilled liquid beverages or toppings, and directing the spillage to a waste container carried on the vehicle.

As still another preferred aspect of the invention, the external apparatus of the dispensing system is sufficiently spaced from the opening or window from which the confections or containers are dispensed and sold, to allow dispensing of the confections or containers at the dispensing opening or window, separately from the filling of the containers or application of the toppings to the confections.

In summary, a dispensing system for liquids is disclosed which is contained in a mobile structure, via wheels or motor/engine, so as to give or deny access to users, and when access is allowed, give them the option of dispensing the desired amount of liquid. The dispensing system has the ability to be exposed or enclosed within the structure to allow/limit the access to users, and when enclosed, allow for cleaning and transportation of the structure to prevent any damage to the dispensing system.

DETAILED DESCRIPTION OF PREFERRED EMBODIMENTS

Figure 1:
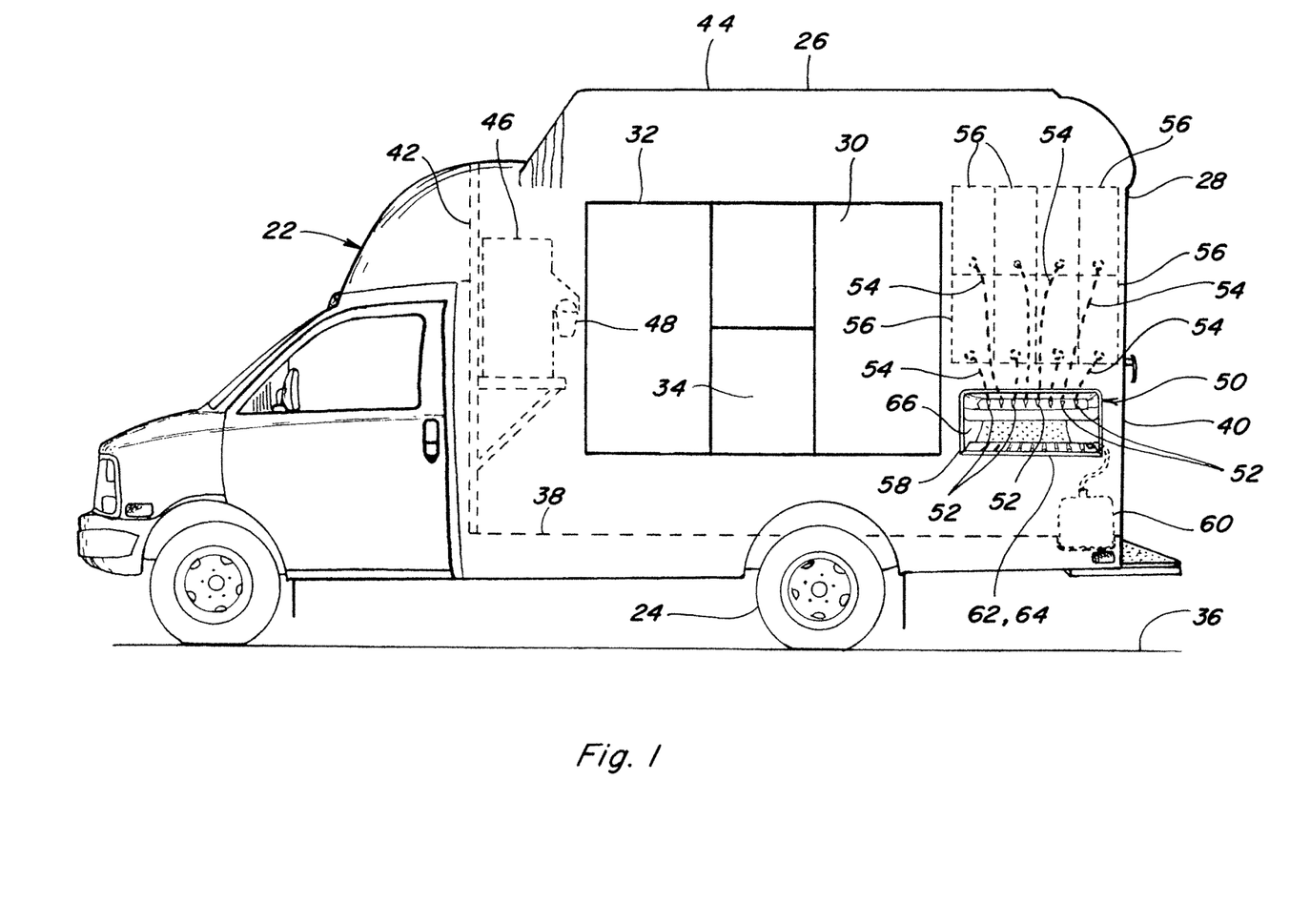
FIG. 1 is simplified side view of a mobile confectionary apparatus of the invention.

Referring now to the drawings wherein like numbers refer to like parts, in FIG. 1, a mobile confectionary apparatus 20 constructed and operable according to the teachings of the present invention is shown. Apparatus 20 is shown here as including a conventional truck 22, including an engine and drive line (not shown) operable for drivingly rotating a pair of rear wheels 24 in the well known conventional manner, for propelling truck 22 over roads and the like to various destinations. Truck 22 supports a mobile structure 26, which is essentially a box, including a side wall 28, enclosing an interior space 30, viewable through a transparent service window 32 in side wall 28. Window 32 includes a confection dispensing opening 34, through which confections, or containers therefore, can be dispensed, and transactions for the confections conducted. Window 32 is located at a suitable elevation above a surface 36 on which truck 22 is located, for a person standing beside the truck to receive a confection through the window. Interior space 30 is sufficiently large for receiving a person, and is bounded on the opposite side by another side wall, on the bottom by a floor 38, on the rear by a rear wall 40, on the front by a front wall 42, and above by a roof 44. Roof 44 is spaced above floor 38 sufficiently for a person in interior space 30 to stand, and space 30 will preferably contain apparatus for use in making or preparing confections, as well as other apparatus, as required, for storing supplies, e.g., containers, for the confections, and for conducting the transaction, e.g., a cash register or the like (not shown).

Mobile confectionary apparatus 20 is preferably configured for making and serving frozen confections, in particular, ice confections, such as, but not limited to, shaved ice and/or snow cones, onto which a topping, such as a flavored liquid such as a syrup, is to be applied. For this purpose, a machine 46 representative of well known machines usable for preparing shaved ice, snow cone, or other frozen confections, is illustrated in dotted lines in interior space 30, operable by a user in the well known manner for preparing a frozen confection 48. Here, it should be recognized and understood that apparatus 20 can include a wide variety of equipment and confectionary devices in addition to, or as an alternative to, machine 46 illustrated, such as, but not limited to, a freezer, cooler, and/or the like (not shown), as desired or required for a particular application.

Referring also to FIGS. 2, 3, 4 and 5, apparatus 20 includes a liquid dispensing system 50 attached to or incorporated into mobile structure 26, so as to be configurable in a dispensing or open mode for allowing use by persons outside of the structure for applying a liquid topping to a confection, or filling a container with a liquid confection, and in a closed or protected mode for denying access to dispensing of liquids, and protecting apparatus of system 50 from damage by a user and environmental elements, such as dirt, rain, road spray, and the like, and also for allowing cleaning of the apparatus from within interior space 30. Generally, system 50 includes one or more liquid dispensers, e.g., with or without an overflow/spill or catch basin attached to, or creating a structural element to be attached to, the structure.

Preferably, liquid dispensing system 50 is disposed in or on side wall 28 of apparatus 20, and includes at least one liquid dispenser 52 positioned, when system 50 is in the dispensing mode, at a suitable height and location so as to be manually operable by a person located outside of the vehicle for dispensing a liquid, e.g., a topping such as a flavored syrup, on a confection (illustrated by confection 48 in FIG. 3); or a beverage into a container such as a cup or the like, disposed generally beneath the dispenser 52. Here, a row of dispensers 52 is utilized to provide a variety of flavored toppings, at a height sufficiently low to be accessible by children and disabled persons, which height can be within a range of from about 30 to about 48 inches above a surface on which truck 22 is located. Each dispenser 52 comprises a conventionally constructed and operable hand operated valve or spout, such as those commonly found on picnic jugs or commercial coffee makers, although alternatively, a variety of other selectably operable valve or closure devices could be used. Each dispenser 52 is connected by a liquid line 54, which can be, for instance, a flexible plastic tube, to a reservoir 56 carried on mobile structure 26 and containing a quantity of the liquid to be dispensed by the dispenser. System 50 additionally includes a tray 58 spaced at least generally below dispensers 52 and configured for catching toppings or other liquids or matter dropped from dispensers 52, or overflowing from a confection or container, such as confection 48, and directing the waste liquid or matter to a waste container 60 carried on the vehicle. Additionally, when system 50 is in the closed mode, tray 58 comprises a cover member which covers and protects dispensers 52.

In this latter regard, tray 58 is preferably disposed on and/or forms a part of, a cover member 62 which is a portion of an L-shaped structure 64 including a backsplash 66 oriented at a fixed angle of about 90° to cover member 62. L-shaped structure 64 is preferably of sheet metal or plastic material, and is pivotally mounted by a pivot joint 68, which can be a piano or other hinge, to side wall 28 below an opening 70 therethrough, so as to be pivotable between an open or dispensing position wherein tray 58 and cover member 62 are substantially horizontal (FIGS. 1, 2, 3 and 5) and backsplash 66 is substantially vertical, and a closed or covered position wherein tray 58 and cover member 62 are generally vertical and disposed in covering relation to opening 70 (FIG. 4A), and thus in covering relation to and protecting dispensers 52 from access and damage by persons outside of the vehicle, and from contact with environmental elements.

Figure 4:
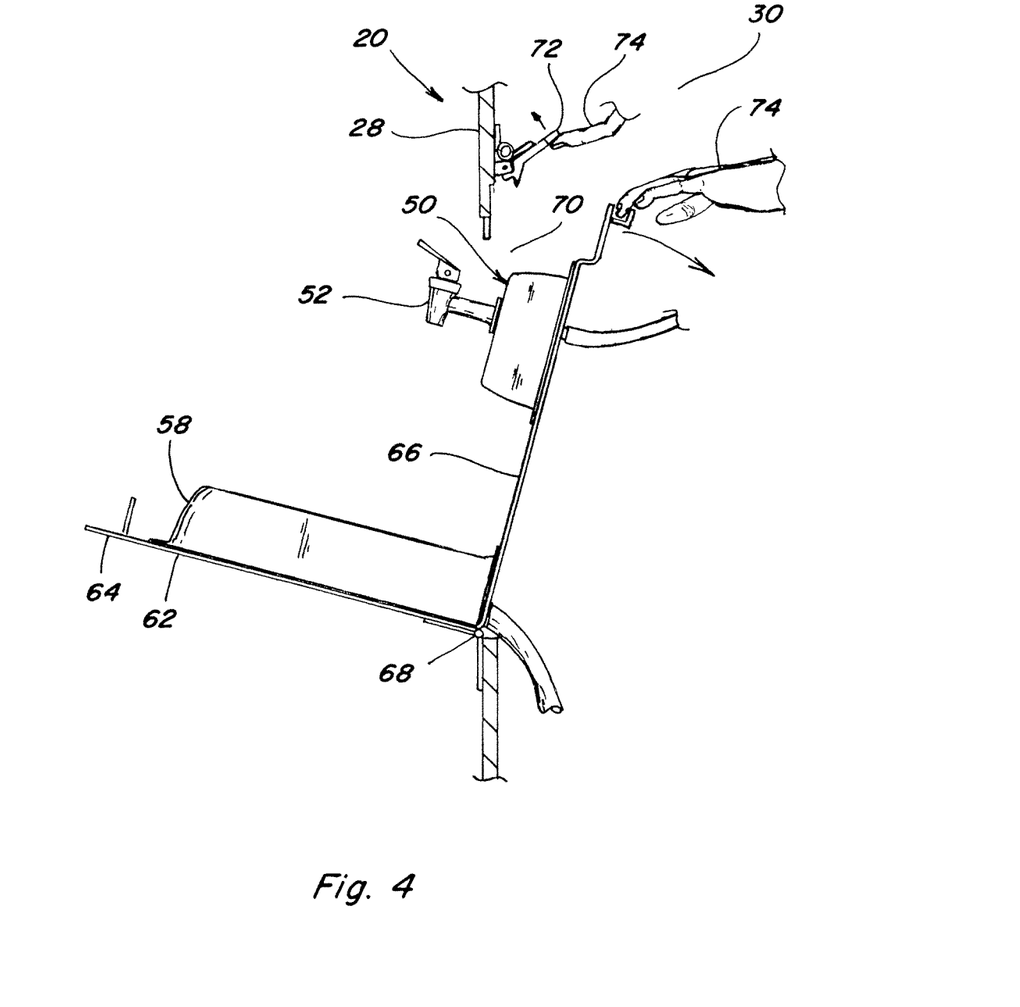
FIG. 4 is still another simplified sectional view of the dispensing system, being moved by a person from the dispensing mode to a closed mode.

A detent 72, which can be, but is not limited to, a mechanical latch, clamp, clip, or the like, is disposed on side wall 28 adjacent to opening 70 (here illustrated above opening 70) in a position for engaging a periphery of backsplash 66, for releasably holding L-shaped structure 64 in the open position. Detent 72 is manually operable for releasing structure 64 by a person located within interior space 30, for instance, by application of an upward force using one or more fingers of a person's hand 74, as illustrated in FIG. 4. Once released, structure 64 can be manually moved to the closed position (shown in FIG. 4A, and in dotted lines in FIG. 2), to engage cover member 62 with the outer surface of side wall 28 around the periphery of opening 70, and to position dispensers 52, tray 58, and backsplash 66 within interior space 30, so as to be accessible to a person located therein, for cleaning or other purposes. A suitable detent or latch (not shown) such as, but not limited to, another detent 72, can be utilized for releasably holding L-shaped structure 64 in the closed position.

Figure 2:
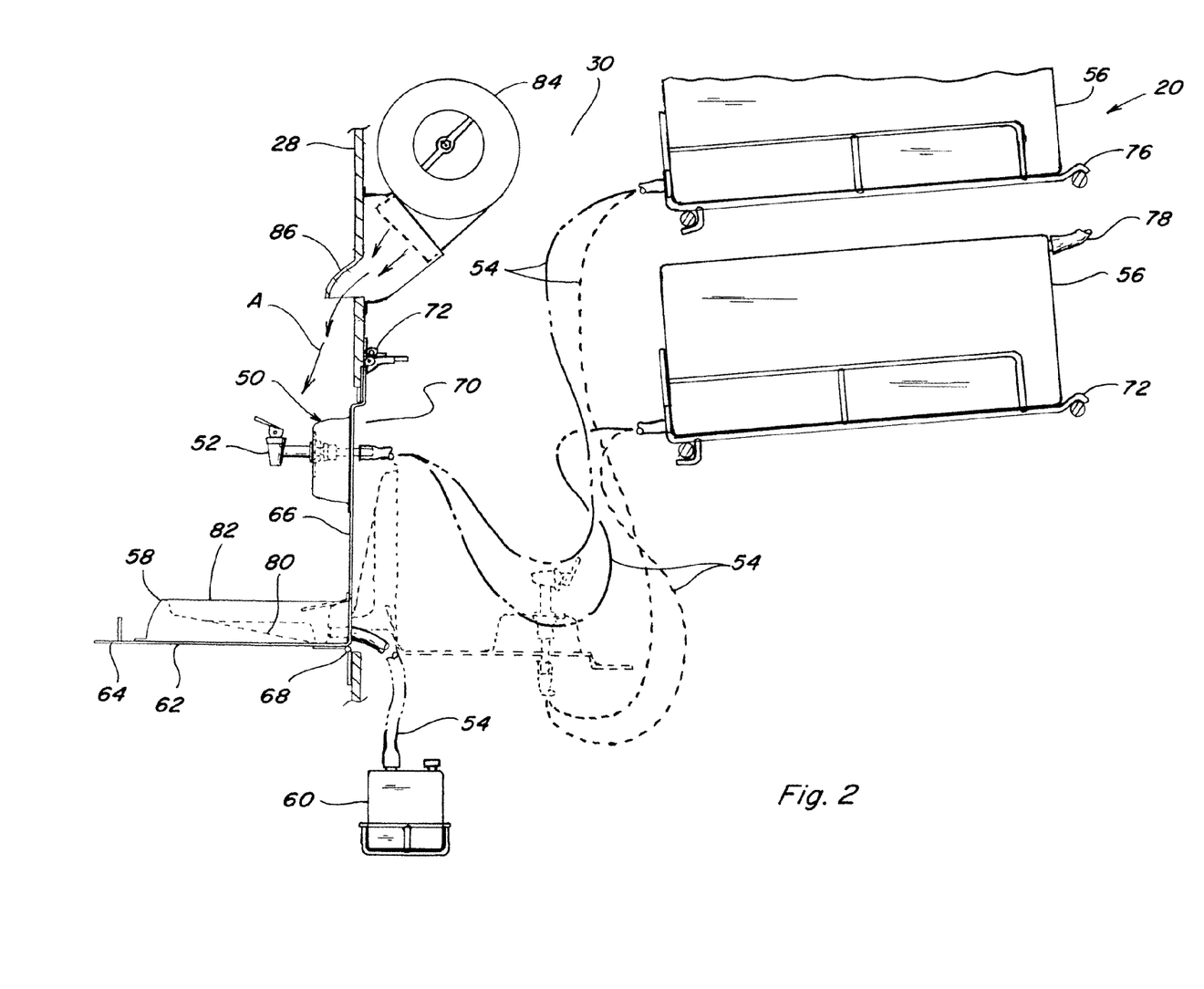
FIG. 2 is a simplified sectional view of the apparatus, showing aspects of a liquid dispensing system of the apparatus in an open or dispensing mode.
Figure 3:
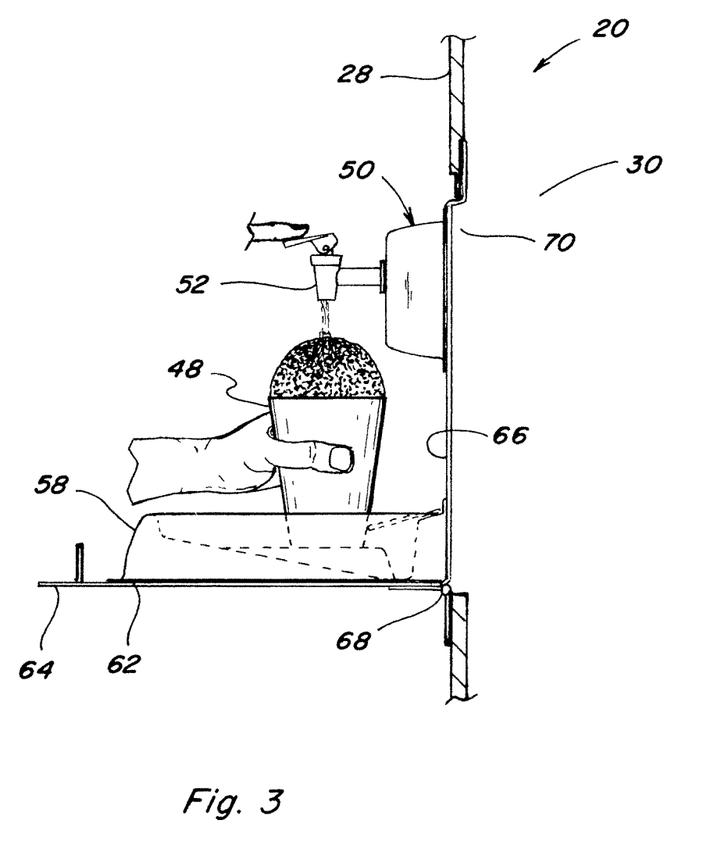
FIG. 3 is another simplified sectional view of the confectionary apparatus, showing aspects of the dispensing system, and illustrating a person using the system to apply a topping on a confection.
Figure 4A:
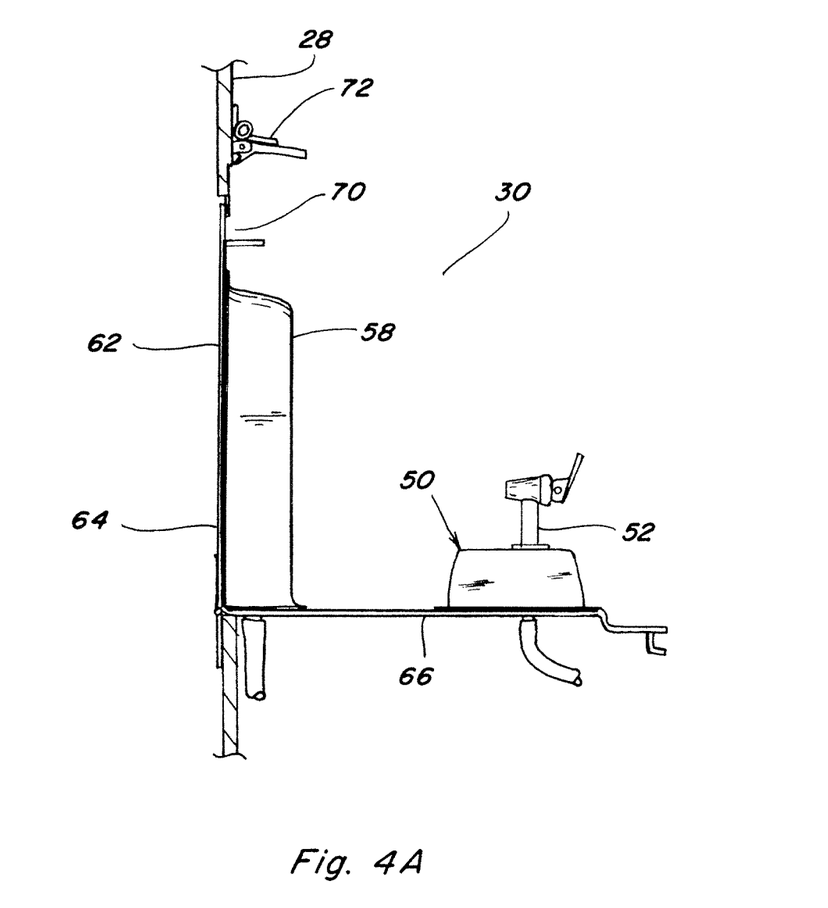
FIG. 4A is still another simplified sectional view of the dispensing system, in the closed mode.

Referring more particularly to FIG. 2, reservoirs 56 can be conveniently supported on racks 76 or other suitable structure or the like within interior space 30, preferably above the elevation of dispensers 52. Liquid lines 54 extending between reservoirs 56 and dispensers 52, are preferably flexible, and of sufficient length, to facilitate movement of L-shaped structure 64 between the open and closed positions. Also preferably, each reservoir 56 includes a vent 78 in an upper portion thereof, to facilitate liquid flow therefrom when the associated dispenser 52 is opened. Additionally, each reservoir 56, and the connecting liquid line, is preferably of a clear material, to enable viewing the quantity of liquid contained therein, as well as fluid flow characteristics, from within interior space 30. Similarly, a liquid line 54 is preferably provided extending from tray 58 to waste container 60, and is flexible to facilitate the pivotal movements of L-shaped structure 64. To facilitate flow toward liquid line 54 in connection with waste container 60, tray 58 has a overflow/spill catch basin 80 which slopes downwardly toward an inlet of line 58, and a generally flat upper surface 82 of ribbed construction or the like, on which a container can rest, as illustrated in FIG. 3. After waste container 60 is full, or is otherwise desired to empty the contents thereof, it is removable and detachable from line 54.

As an additional, optional feature, a blower 84 can be provided for directing a flow of air, as denoted by arrow A, over or across dispensers 52, and tray 58, for keeping bees, hornets, wasps and other insects away from those aspects of system 50, as such insects may be attracted thereto, particularly when sugary liquids are present. The flow of air can be directed downwardly, sidewardly, or in any desired manner which achieves the desired effect. Blower 84 can be battery-powered or powered by an external power source in connection with apparatus 20. As an example of one manner of directing the air flow, one or more louvers may be provided in connection with blower 84 through side wall 28, for directing the air flow downwardly toward dispensers 52. Here also, blower 84 is illustrated as being located within interior space 30, but it could alternatively be located at a variety of other locations on apparatus 20, including on L-shaped structure 64, or the airflow could be directed over the dispensers 52 by a suitable duct from blower at a remote location on the vehicle.

Figure 5:
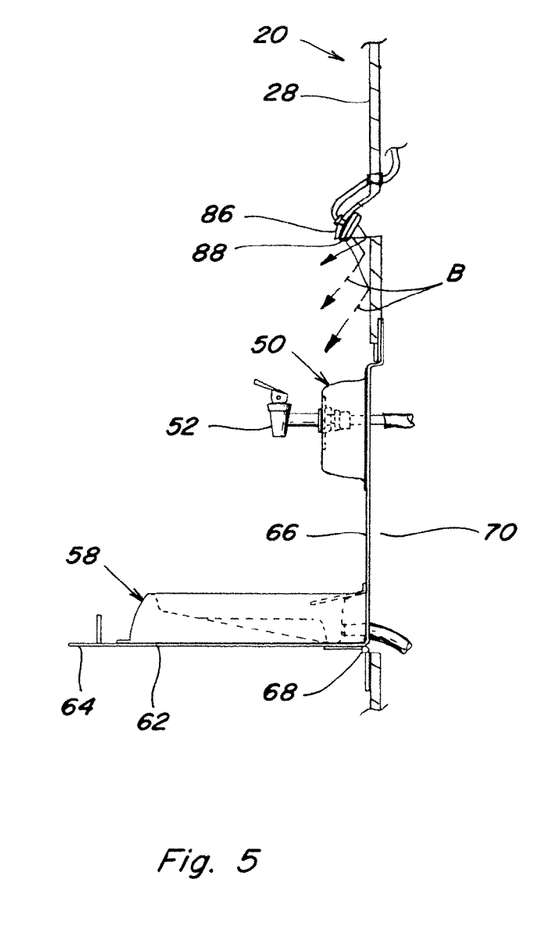
FIG. 5 is another simplified sectional view of the apparatus, shown including an optional light in an air blower louver of the dispensing system.

As still another feature, as illustrated in FIG. 5, a light 88 operable for illuminating the external components of system 50 for use after dark, as generally denoted by arrows B, can be provided on louver 86 or another location. Light 88 can be battery-powered, or powered by an external power source in connection with apparatus 20, as desired or required for a particular application.

Figure 6:
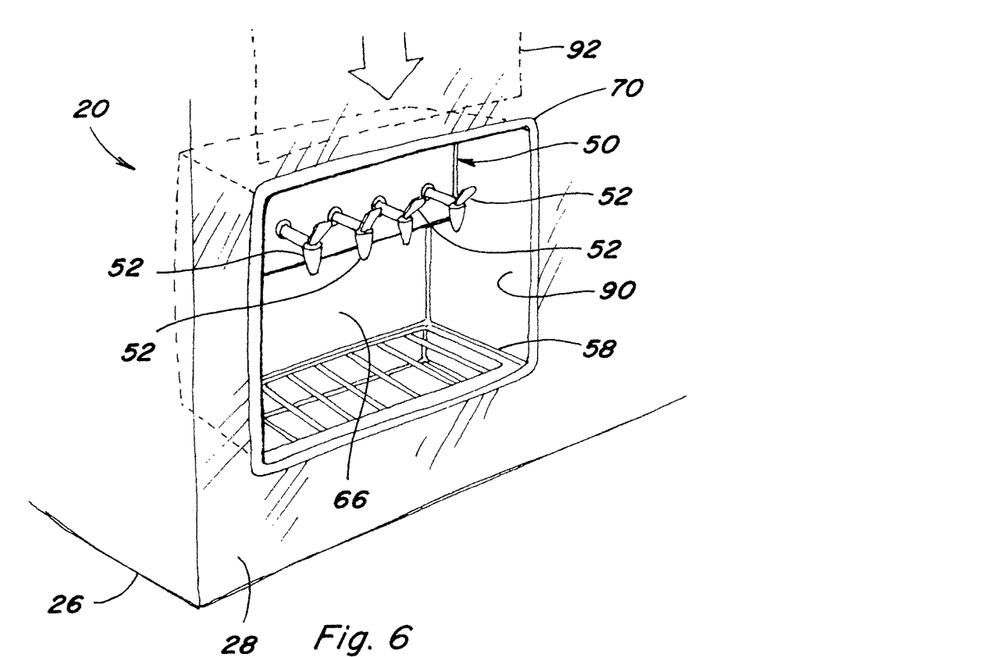
FIG. 6 is a perspective view of a mobile confectionary apparatus including aspects of the liquid dispensing system embodied in an alternative support structure according to the invention.

Referring also to FIGS. 6, 7, 8, 9, 10 and 11, several alternative structures for housing and supporting aspects of liquid dispensing system 50 are shown, like elements of these structures to those of the previously described system 50 being identified by like numerals. Referring more particularly to FIG. 6, liquid dispensers 52 of system 50 are located within a recess 90 within mobile structure 26, accessible through opening 70. Liquid dispensers 52 are supported on a backsplash 66 above tray 58, and are connected to reservoirs 56 (e.g., FIG. 1) in the above described manner. Tray 58 will also be connected to a waste container. Here, tray 58 and backsplash 66 are preferably fixed or fixable in position, and can be covered by a sliding cover member 92 carried within or behind side wall 28, and movable by a person from within structure 26 to cover opening 70, as denoted by the large arrow.

Figure 7:
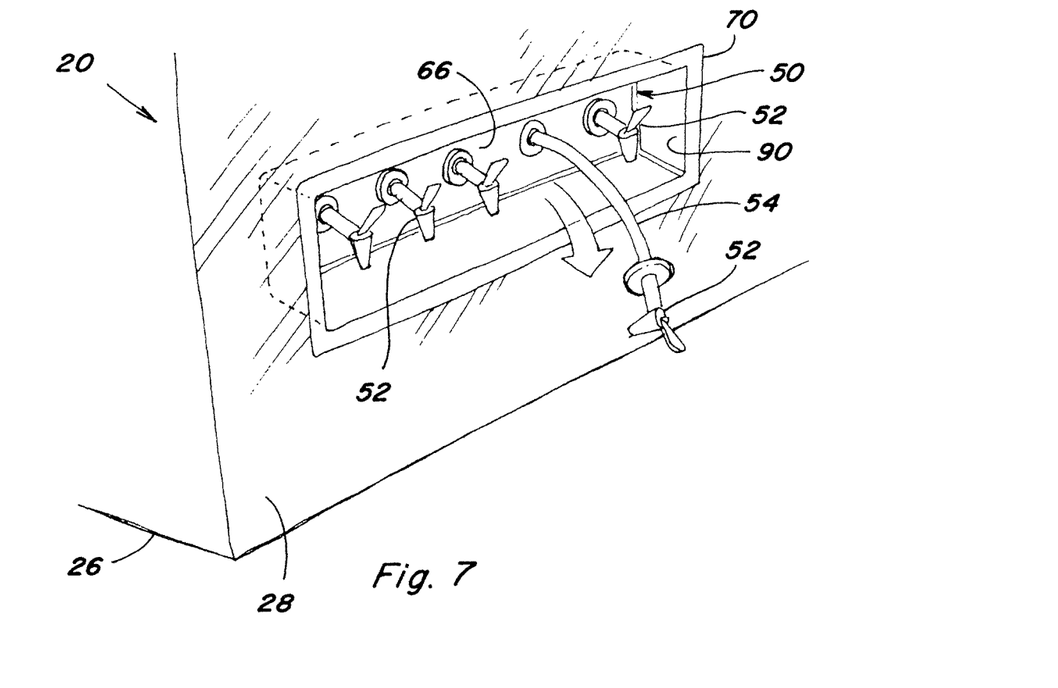
FIG. 7 is a perspective view of a mobile confectionary apparatus showing aspects of the liquid dispensing system embodied in another construction according to the invention.

Referring more particularly to FIG. 7, as another alternative, liquid dispensers 52 of system 50 are supported on backsplash 66 in a recess 90 accessible through an opening 70 on side wall 28 of structure 26, dispensers 52 being individually connected to liquid lines 54 and pullable by a user outwardly through opening 70 for use.

Figure 8:
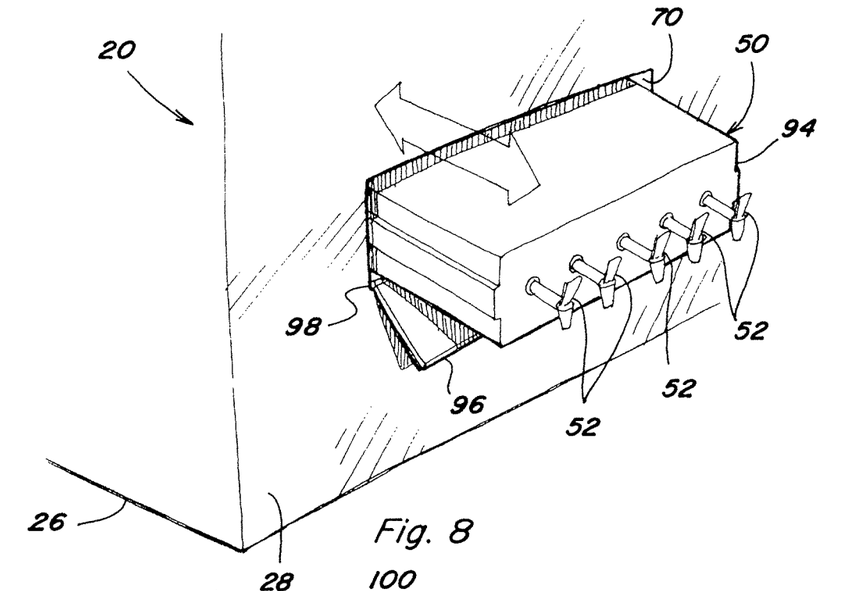
FIG. 8 is a perspective view of a mobile confectionary apparatus showing aspects of the liquid dispensing system embodied in another construction according to the invention.

In FIG. 8, liquid dispensers 52 of system 50 are shown supported on a drawer 94 mounted in opening 70 of side wall 28 of structure 26, for movement inwardly and outwardly by a person located within structure 26, between a closed or protected position, and an open or dispensing position (shown). A cover member 96 pivotally mounted to side wall 28 adjacent the lower periphery of opening 70 by a self-closing hinge 98, will automatically pivot into closing relation to opening 70 when drawer 94 is moved to its closed position.

Figure 9:
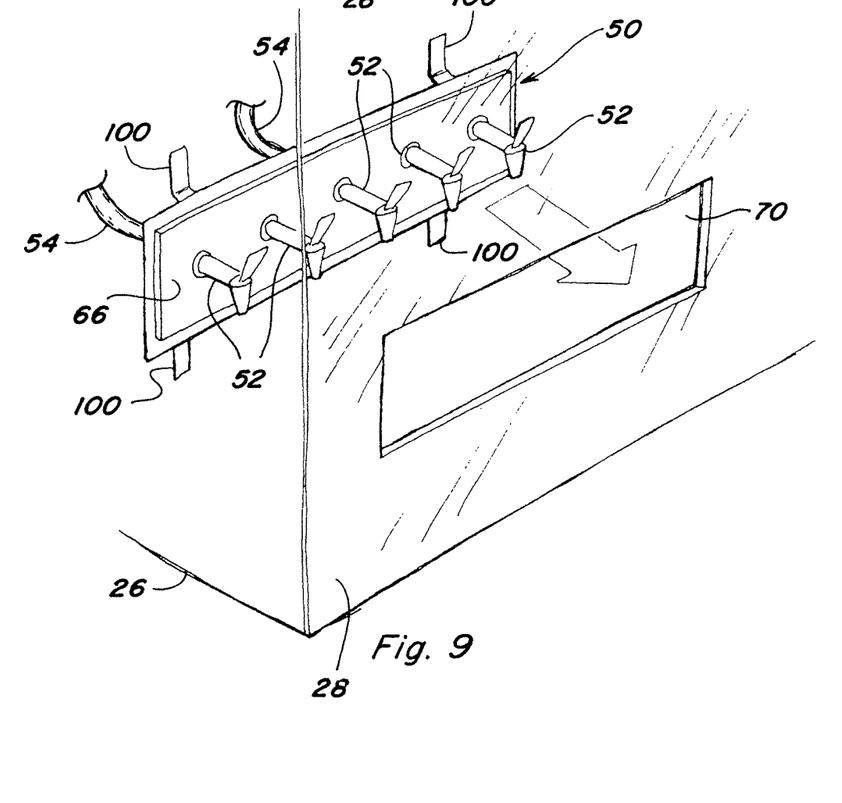
FIG. 9 is a perspective view of a mobile confectionary apparatus showing aspects of the liquid dispensing system embodied in still another construction according to the invention.

FIG. 9 shows still another alternative mounting structure for aspects of system 50, here including a plurality of liquid dispensers 52 thereof, which mounting structure includes a backsplash 66 mountable by a person from within structure 26, in an opening 70 of side wall 28 of the structure. Liquid lines 54 will connect with reservoirs carrying the flavored liquids, as disclosed and discussed above. Suitable detents, such as detents 72 discussed and disclosed above, or other retainer elements, e.g., slots or grooves (on the inside of side wall 28), can be utilized for engaging tabs 100 on backsplash 66, for retaining it in the opening.

Figure 10:
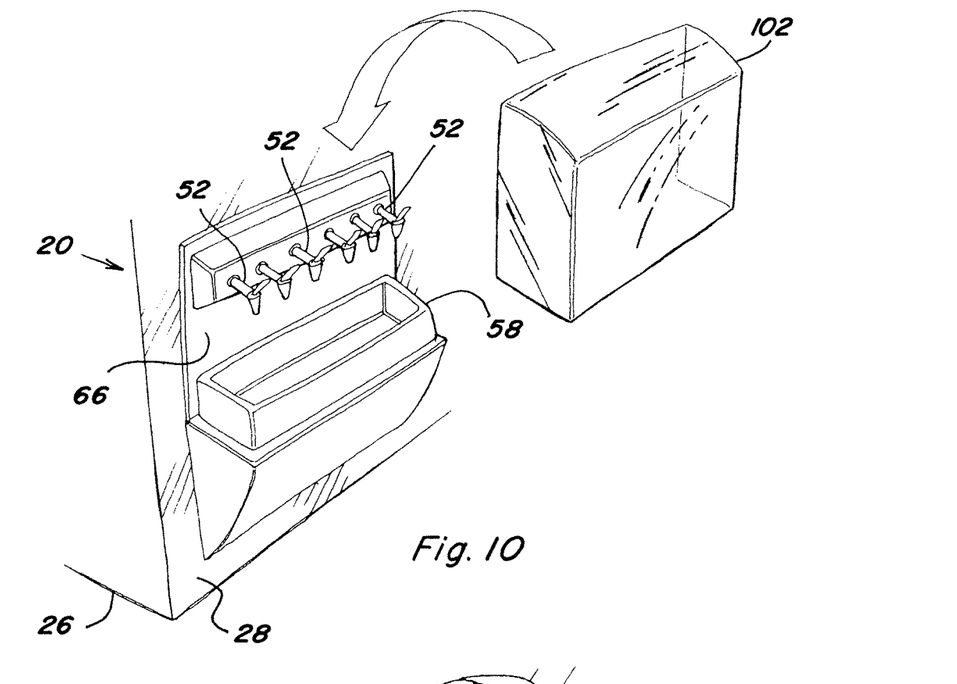
FIG. 10 is a perspective view of a mobile confectionary apparatus showing aspects of the liquid dispensing system embodied in still another construction according to the invention, and including a cover member for the aspects of the system.

In FIG. 10, still another alternative mounting structure for aspects of system 50 are shown. Here, backsplash 66 and an integral tray 58 are shown permanently affixed to the outer surface of side wall 28 of structure 26, with a plurality of liquid dispensers 52 projecting from the backsplash. A removable cover member 102 is illustrated as being positionable and securable in covering relation to dispensers 52 and tray 58, as denoted by the large curved arrow. Liquid dispensers 52 will connect with the reservoirs, as already explained.

Figure 11:
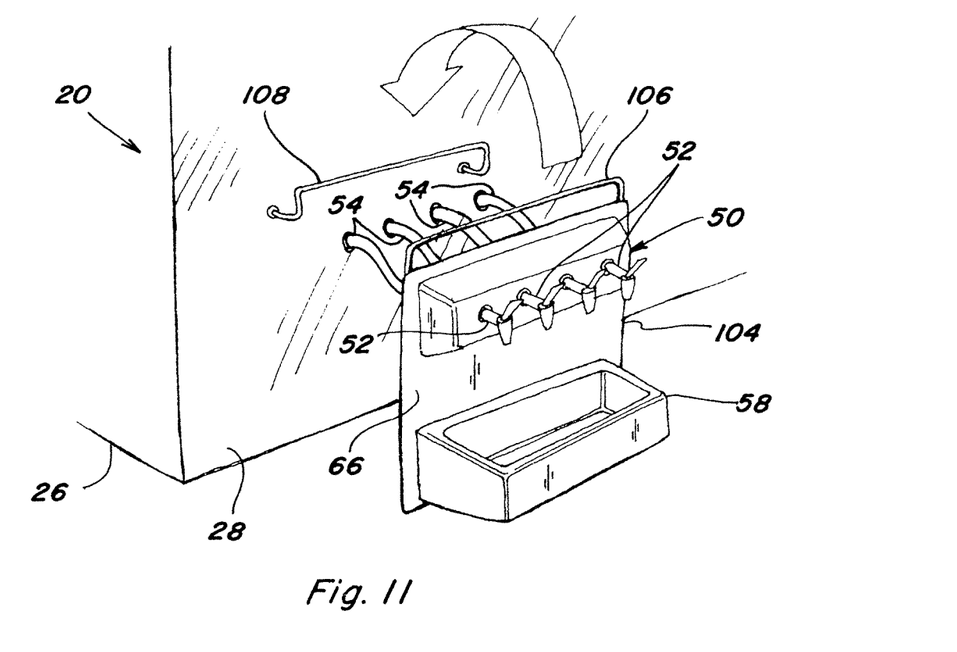
FIG. 11 is a perspective view of a mobile confectionary apparatus showing aspects of the liquid dispensing system embodied in still another construction according to the invention, shown being installed on a side wall of the apparatus.

FIG. 11 shows still another structure 104 for supporting liquid dispensers 52 and tray 58 of system 50 on an outer surface of a side wall 28 of a mobile structure 26, here, backsplash 66 and tray 58 being incorporated into structure 104, which is hangable on the side wall using cooperatively engageable hanger brackets 106 and 108, as illustrated by the large curved arrow. Again, dispensers 52 are connectable by liquid lines 54, which will extend through side wall 28, to the reservoirs for receiving the flavored liquids therefrom, as already explained.

Thus, there has been shown and described several embodiments of a novel mobile confectionary apparatus and liquid dispensing system, which overcomes many of the problems set forth above. It will be apparent, however, to those familiar in the art, that many changes, variations, modifications, and other uses and applications for the subject device are possible. All such changes, variations, modifications, and other uses and applications that do not depart from the spirit and scope of the invention are deemed to be covered by the invention which is limited only by the claims which follow.

What is claimed is:

1. A mobile confectionary apparatus, comprising:
    a mobile vehicle;
    an opening provided in the mobile vehicle through which a prepared confection or container may pass;
    a liquid reservoir containing a dispensable topping located within the mobile vehicle; and
    a liquid toppings dispensing system comprising a backsplash and a plurality of topping dispensers supported by and extending outwardly from the backsplash, each of the plurality of topping dispensers being operable for dispensing a liquid topping,
    wherein the liquid toppings dispensing system is configured to removably hang on an upstanding external side of the mobile vehicle so that the liquid toppings dispensing system is engageably positionable on the external side of the mobile vehicle and entirely disengageable therefrom, with the backsplash confronting the external side of the mobile vehicle when hung thereon.

2. The mobile confectionary apparatus of claim 1, wherein the liquid dispensing system further comprises:
    at least one hanger configured to removably hang the liquid toppings dispensing system on the exterior of the mobile vehicle.

* * * * *